United States Patent [19]

Cornwell

[11] Patent Number: 5,250,578
[45] Date of Patent: Oct. 5, 1993

[54] FOAMED CEMENTITIOUS COMPOSITION AND METHOD OF MAKING

[76] Inventor: Charles E. Cornwell, 7104 Marlan Dr., Alexandria, Va. 22307

[21] Appl. No.: 726,196

[22] Filed: Jul. 5, 1991

[51] Int. Cl.$^5$ .................... C04B 38/00; C08J 9/00
[52] U.S. Cl. ........................ 521/83; 521/100; 106/122
[58] Field of Search ............... 521/83, 100; 106/122

[56] References Cited

U.S. PATENT DOCUMENTS

| | | | |
|---|---|---|---|
| 3,141,857 | 7/1964 | Sommer | 521/83 |
| 3,686,133 | 8/1972 | Hattori et al. | 252/354 |
| 3,775,351 | 11/1973 | Sachs | 521/68 |
| 3,819,388 | 6/1974 | Cornwell | 524/5 |
| 4,060,425 | 11/1977 | Harada et al. | 524/59 |
| 4,077,809 | 3/1978 | Plunguian et al. | 521/83 |
| 4,100,115 | 7/1978 | Baer | 521/83 |
| 4,137,198 | 1/1979 | Sachs | 521/83 |
| 4,166,749 | 9/1979 | Sterrett et al. | 521/83 |
| 4,325,736 | 4/1982 | Okada et al. | 521/83 |
| 4,596,834 | 6/1986 | Widener et al. | 521/83 |

FOREIGN PATENT DOCUMENTS

| | | |
|---|---|---|
| 7036754 | 11/1979 | Japan . |
| 6050171 | 5/1981 | Japan . |
| 1075540 | 3/1989 | Japan . |
| 8101599 | 10/1982 | Netherlands . |

*Primary Examiner*—John Kight, III
*Assistant Examiner*—Rabon Sergent
*Attorney, Agent, or Firm*—Breiner & Breiner

[57] ABSTRACT

A foamed cellular cementitious composition useful for sound absorbing, thermal insulation and fire proofing is described. The cementitious composition is produced utilizing a mineral cement, an aggregate, water, and a stabilized foaming composition which includes at least one water-soluble film forming agent, and at least one foaming agent. The stabilized foaming composition provides air to the cementitious composition in an amount substantially in excess of that used in conventional air entrainment of cements. The film forming agent is preferably a resin emulsion and the foaming agent is preferably a nonionic surfactant, anionic surfactant or mixture thereof. The cementitious compositions have a density which is substantially lower than the density of a composition composed of mineral cement and aggregate per se.

20 Claims, 1 Drawing Sheet

(NRC = .80)

ABSORPTION COEFFICIENT (STC = 40)

TRANSMISSION LOSS (dB)

FOAMED CEMENTITIOUS COMPOSITION AND METHOD OF MAKING

FIELD OF THE INVENTION

The present invention is directed to a cementitious composition having an interconnected cellular structure which is capable of absorbing sound waves, providing thermal insulation and fire proofing. The cementitious composition is formed utilizing cement, an aggregate, water, and a stabilized foaming composition.

BACKGROUND OF THE INVENTION

U.S. Pat. No. 3,819,388, having the same inventor as the present invention, describes a process for forming lightweight cellular cementitious compositions from a mineral cement, a lightweight mineral aggregate, a nonionic surfactant, water, and, optionally, polyvinylacetate. The nonionic surfactant acts as a bubble forming additive to provide a cementitious composition that has a cellular structure with equal distribution of cells throughout the composition. The nonionic surfactant can be combined with an anionic surfactant in use. The water is utilized in the processing and is required to render the cement settable.

U.S. Pat. No. 4,077,809 describes improvements in the stabilization of aqueous foamed compositions which involve the incorporation of certain synthetic resin emulsions which are film formers at room temperature into an aqueous foaming composition. The synthetic resin and plasticizer components of these emulsions have a glass transition temperature of about 10° C.–25° C. Suitable components in these emulsions are vinyl acetate, an acrylate homo-, co- or terpolymer, and styrene butadiene resins.

The present invention involves further improvements to foamed cementitious products as described above and the procedure utilized to produce such products. The particular features and advantages of the present invention will become apparent from the description below. The foamed cementitious compositions of the present invention can be formed into final products utilizing conventional techniques such as pumping, spraying, casting or trowelling to provide settable lightweight cellular compositions. The compositions of the invention, however, provide final products having densities which are appreciably less than the density of a conventional mix of mineral cement and aggregate. For example, the portland and calcium aluminate cement compositions of the present invention can be produced in a range of 20-90 pounds per cubic foot air-dry densities, while the gypsum cement compositions of the invention can be produced in a range of about 12-30 pounds per cubic foot.

OBJECTS AND BRIEF DESCRIPTION OF THE INVENTION

The present invention is directed to providing a stable lightweight cellular cementitious composition capable of providing sound absorption, thermal insulation, and fire proofing. The cementitious compositions of the present invention have densities appreciably less than that of conventional mineral cement and aggregate compositions. The cementitious composition of the invention is particularly useful in providing sound absorption since the interior interconnecting cellular structure of the composition has at least 20%-100% of the surface area open thereby giving sound waves access to the interconnected cellular structure.

The cellular compositions of the present invention are produced utilizing a mineral cement, an aggregate, water, and a stabilized foaming composition which includes at least one water-soluble film-forming agent and at least one foaming agent. The preferred film-forming agent is an emulsion of a synthetic resin. The resin preferably has a transition temperature of about 10° C.-25° C. The stabilized foaming composition provides air into the composition mixture in an amount substantially in excess of that used in conventional air entrainment cements. The components of the process can be mixed and applied utilizing conventional techniques such as spraying, casting or trowelling. Mineral cements suitable for use in the present invention include portland cement, calcium cement, gypsum cement, magnesia cement or the like.

DESCRIPTION OF THE PRESENTLY PREFERRED EMBODIMENTS

Figure 1:
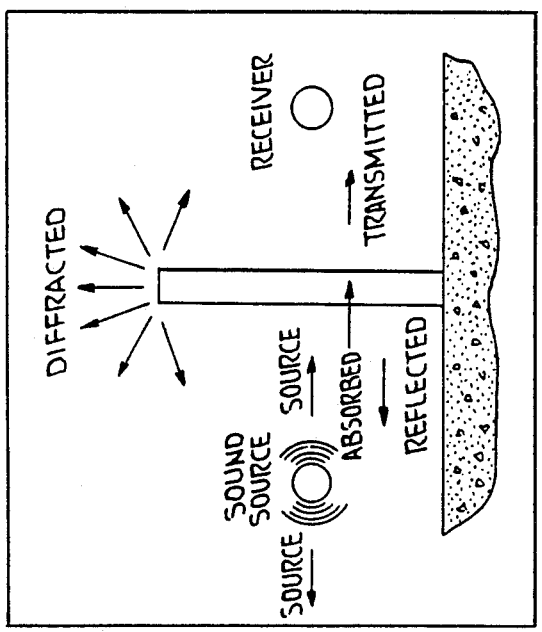
FIG. 1 is a schematic illustrating the interaction between sound and a barrier formed of a cementitious composition.

The stable lightweight cellular compositions of the present invention are produced utilizing a mineral cement, an aggregate, and water. Suitable mineral cements for use in the composition include portland cement, calcium cement, gypsum cement, magnesia cement, and the like. The aggregate can be any of heat expanded lightweight minerals or conventional sand. More particularly, suitable aggregates include the lightweight variety such as perlite, vermiculite, expanded shale, and clay, or can be of a higher density sand for providing greater compressive strength. Further, if desired, reinforcing fibrous material, such as polyester fibers or fiberglass, can be used therewith. When present, such fibers can be present as either chopped fibers or fiber fabric.

An appreciable reduction in the density of the products made utilizing cement and aggregate can be achieved by incorporating air cells into the cementitious slurries utilized to provide the cementitious compositions when the air cells are incorporated in an amount substantially in excess of the amount of air conventionally introduced in the production of air entrained concrete. This excess amount of air cells is provided in the present invention through the incorporation of stabilized foaming composition into the cementitious slurry. The stabilized foaming composition includes at least one water-soluble film forming agent and at least one foaming agent. Optionally, a water-reducing agent or plasticizer can also be incorporated in the stabilized foaming composition. The stabilized foam provided by the composition can be introduced by aeration of the slurry composition or, preferably, by intermixing the slurry with an aqueous foam composition.

In order to incorporate substantial amounts of air into cementitious compositions, a film-forming agent is present in the foaming composition to increase the stability of the foam. The presently preferred stabilizer is a cold water-soluble organic compound, such as a synthetic resin emulsion which is film-forming at room temperature and compatible with the mineral cement used.

Examples of suitable emulsions for use in the present invention are emulsions which preferably have from 47%-55% total solids and have been found to be good foam stabilizers. Such emulsion will generally be present in the cementitious composition of the present invention in a ratio with the other components in an amount of 1-96 parts by weight. Such emulsions can be formed using the following resins: a vinyl acetate homopolymer, a vinyl acetateacrylic copolymer such as Polyco 2151 manufactured by Borden, a vinyl chloride internally plasticized copolymer, a vinyl chloride externally plasticized copolymer, a polyacrylic emulsion such as Rhoplex AC35 manufactured by Rohm & Haas, a carboxylated styrene-butadiene copolymer, a vinyl chloride-vinylidene chloride copolymer, a vinyl chloride-vinylidene chloride-acrylic terpolymer, and the like.

One particularly suitable resin emulsion useful in combination with the other components of the present invention to provide improved cementitious compositions is UCAR Latex 413. UCAR Latex 413 is an acrylic emulsion polymer designed to improve properties of materials containing portland cement. In the past, cement mixtures have been modified with polymers in architectural panel construction, stucco-type coatings for application over a variety of substrates, and floor leveling and patching products. Cementitious formulations modified with UCAR Latex 413 have shown improved compressive, flexural, bonding, and abrasive properties Modified mortars made using UCAR Latex 413 showed excellent adhesion to a variety of substrates including concrete, brick, metal, insulating foam, and wood. Modified mortars containing UCAR Latex 413 are stable to ultraviolet light and resistant to discoloration due to sunlight exposure. The physical properties of UCAR Latex 413 include 47±1.0% by weight of solids, a pH of 8.5-10, a viscosity of 40-100 cps (Bkfld Viscosity #3 Spindle at 60 RPM), a weight per gallon of 8.8 pounds, and 100 ppm (MAX) of filterable solids when utilizing 100 mesh.

Foaming agents or surfactants which can be utilized in providing the composition of the invention are generally used in an amount of 5% parts by weight or less, preferably 0.5%-4% parts by weight. When the cementitious composition is to be lighter, more air will be incorporated into the slurry providing the composition. This is achieved by incorporating a higher amount of foaming agent into the slurry. The foaming agent utilized can be a nonionic surfactant, an anionic surfactant or a combination of surfactants. In use, foam producing surfactants are admixed to a formulated slurry so that the whole wet composition is stabilized in a foamed, expanded state until the hydraulic cement is set. The cement can then be cured and dried to produce a lightweight useful product. This procedure lends itself particularly suitable for preblending all of the dry components making for efficient storage and shipment. This blend can then be slurried in water and made ready for spraying or casting onto a substrate or into a form.

The foaming or surfactant component, which can be one or more surfactants utilized in combination, is selected from surfactants having high foaming activity. The foam provided by the surfactant is the means by which air cells are incorporated into the cementitious composition. The foaming action provided is stabilized by the film forming agent as described above. The foaming component is preferably a combination of anionic and nonionic surfactants.

Suitable surfactants having the desired foaming characteristics include polyethylene glycol (9) ethylene oxy ethanol such as Tergitol 15-S-9 as manufactured by Union Carbide Chemical & Plastics Co., nonyl phenol polyethyleneoxy ethanol, octyl phenoxy polyethoxy ethanol, and polyoxyethylene (12) tridecyl ether such as Renex 30 manufactured by ICI America and the like. Suitable anionic surfactants which can be utilized include sodium sulfate alkyl phenoxy polyethyleneoxy ethanol, an ammonium salt of $C_{12}$-$C_{15}$ linear primary alcohol ethoxysulfate, alkyl alcohol sulfate, a sodium salt of alkyl aryl polyether sulfonate, a dihexyl ester of sodium sulfosuccinic acid, sodium decyl benzene sulfonate such as Ultrawet 30DS (30% solids) manufactured by Arco, and the like. The preferred surfactant for use is polyethylene glycol ether combined with 9 mols of ethylene oxide. Tergitol 15-S-9 is an excellent foam producing composition. Additionally, siponate soap, which is a powder and produces a detergent foam that foams during the admixing sequence, is also suitable for use.

A presently preferred composition of the invention contains the following components in the following ratios expressed in parts by weight:

| Component | Parts By Wt. |
| --- | --- |
| Cement | 100 |
| Water | 35-150 |
| Aggregate | 10-350 |
| Film Forming Agent(s) | 1-96 |
| Foaming Agent(s) | 0.5-5 |

More preferred compositions of the present invention contain the following components in the following ratios expressed in parts by weight:

| Component | Parts by Wt. |
| --- | --- |
| Mineral Cement | 100 |
| Water | 35-150 |
| Water Reducing Agent | 0-3 |
| Polyethylene Glycol (9) Ethylene Oxy Ethanol | 0.5-4 |
| Mineral Aggregate | 10-350 |
| Water-soluble Organic Film-former | 0.1-2.0 |
| Synthetic Resin Emulsion (47%-55% solids) | 0.3-1.2 |
| Equivalent resin in the emulsion | 0.15-0.66 |
| Synthetic Surfactants | 0.1-3.0 |
| Pozzolonic fly ash | 0-50 |
| Fiberglass | 0-15 |
| Polyester Fibers | 0-15 |
| Thixotropic/Viscosity Control Agent(s) | 0-5 |

Suitable thixotropic and viscosity control agents include Zeothix 265, Aerosil, Hi-Sil 233, and Microsil. When these or similar compositions are used as a thixotropic agent, the tendency of the material to separate during the setting period is reduced.

Zeothix 265 is a precipitated amorphous hydrated silicon dioxide. Typical properties thereof include oil absorption of cc/100 g 200-240, average particle size of 1.5-2.0 micrometers, surface area, BET,$m^2$/g 200-300, density at 25° C. of 2.0 g/ml, a refractive index of 1.45–1.46, a bulk density when packed of 5–7 pounds per cubic foot, and being present in the form of a powder. Zeothix 265 is manufactured by JM Huber Corporation.

Aerosil is a silica produced from silicon tetrachloride in a flame hydrolysis process with oxygen-hydrogen gas. The diameter of the primary particles vary from approximately 0.7 to 40 nanometers (millimicrons). The structure is amorphous. Aerosil is manufactured by Degussa. The compound known as Cab-O-Sil is the same material.

Hi-Sil is a trade name of PPG Industries for their synthetic thixotropic amorphous silica (silicon dioxide) having an average diameter of 0.022 microns which is precipitated as ultrafine spherical particles in powder form.

Additional materials useful as thixotropic agents include Supersil which is the trade name for silica flour from Pennsylvania Glass Sand Corporation. Silica flour, silicon dioxide, shows a chemical analysis of 99.7% silica and is able to pass through a 200 mesh screen. Amorphous silica is 99.5% silica. The particle size is 40 micron in diameter and below. Amorphous silica adds to the corrosion resistance of the material when used with portland cement and increases the bond of the coating to the substrate. Calcium carbonate can be utilized in place of silica flour in order to provide similar results. If a difference is observed, it is in the properties of hardness and abrasion resistance. Silica flour provides slightly better physical properties than calcium carbonate.

Mica refers to a broad class of aluminum silicate-type minerals. Muscovite mica is a complex hydrous potassium aluminum silicate characterized physically by perfect basal cleavage. When milled to nominal 325 mesh wet ground mica powder, the mica appears to be off-white to silvery gray and its particles laminar.

Fly ash is a beneficial additive in that it allows the cementitious composition to be effectively utilized in salt containing environments, such as roadways. The fly ash serves to prevent deterioration of the cementitious composition by the salt. Further, the material is a versatile filler and is chemically inert. The inclusion of fly ash spheres in sound absorbing concrete serves to add to the fire proofness of the material and reduces mixer resistance while improving the flowability of the mix material. Fly ash is a derivative of coal after being fired in an electric generating plant. A hollow glass-hard inner silicate in the form of high strength spheres ranging from 5 to 300 microns in diameter is a by-product of such a process. Fly ash varies extensively and Table IV below provides a chemical analysis expressed by weight of various fly ash components.

TABLE IV

| Component | Max | Min | Typical |
|---|---|---|---|
| Silicon (as $SiO_2$) | 51 | 45 | 48 |
| Aluminum (as $Al_2O_3$) | 32 | 24 | 27 |
| Iron (as $Fe_2O_3$) | 11 | 7 | 9 |
| Calcium (as $CaO$) | 5.4 | 1.1 | 3.3 |
| Magnesium (as $MgO$) | 4.4 | 1.5 | 2.0 |
| Potassium (as $K_2O$) | 4.5 | 2.8 | 3.8 |
| Sodium (as $Na_2O$) | 1.7 | 0.9 | 1.2 |
| Titanium (as $TiO_2$) | 1.1 | 0.8 | 0.9 |
| Sulphur (as $SO_3$) (Soluble) | 1.3 | 0.3 | 0.6 |
| Chlorine (as Cl) | 0.15 | 0.05 | 0.08 |

Occasionally, ashes are found having analysis outside of the ranges described in Table IV. Freak variations occur, particularly with iron and calcium, but extreme values of this kind usually refer to ashes from coals from individual colleries, or even individual seams, and are not representative of the output of large modern power stations from which most draw their coal supplies from several colleries.

Table V below shows the chemical analysis expressed by weight of fly ash from four different locations, and without any modification, their relative reactivity with curing agents.

TABLE V

| Flyash From | Gilette Wyoming | Colorado Springs | Wisconsin | Virginia |
|---|---|---|---|---|
| Silicon Dioxide | 38.7 | 61.3 | 44.93 | 46.8 |
| Aluminum Dioxide | 23.5 | 24.9 | 21.45 | 37.4 |
| Iron Oxide | 5.3 | 3.8 | 7.45 | 1.3 |
| Calcium Oxide | 24.6 | 3.5 | 18.16 | 1.8 |
| Magnesium Oxide | 4.2 | 1.3 | 1.36 | 0.3 |
| Sulfer Trioxide | 1.48 | 0.3 | 1.36 | 0.4 |
| Reactivity With Curing Agents | Most | None | Very | None |

The Gilette, Wyoming flyash is from a sub-bituminous mine. The seams are approximately 70 feet thick and the analysis is consistent. It is the most reactive of the ashes tested. The amount of calcium oxide and magnesium oxide present is the cause of the reaction. Non-reactive ash can be modified to provide reactivity by adding small amounts of calcium oxide and magnesium oxide during blending. For normal concrete use, class F is desirable for use in a sulfate environment in order to prevent the sulfate from attaching to the concrete.

A further suitable additive is a colorant, if desired. Titanium dioxide, iron oxide, ferric oxide, and chromium oxide are all useful as color pigments in the composition of the present invention.

The presently preferred method of combining the components utilized in producing the composition of the present invention having an interconnected cellular structure involves weighing the correct proportion of each ingredient into a blender, preferably a ribbon-type blender, and mixing until a uniform mixture is achieved. The cementitious slurry is composed of an aqueous dispersion of cement, foaming agent, aggregate, latex acrylic-emulsion polymer and, if present, fly ash or other additives such as polyester fibers when a very low density composition is desired. The cementitious slurry is preferably mixed batchwise, such as in a mortar mixer (paddle mixer) or ribbon mixer. The mixers will be set at a pre-selected RPM that will cause the slurry to foam. The foamed cementitious slurry can then be applied by pumping, spraying, casting or trowelling to a substrate or into a form and, thereafter, allowed to set, cure, and dry to produce the lightweight composition of the invention.

Specific examples of cementitious compositions according to the present inventions, are set forth below.

Examples 1–6, as set forth in Table I below, are examples of foam stabilization compositions.

TABLE I

| Example No. | 1 | 2 | 3 | 4 | 5 | 6 |
|---|---|---|---|---|---|---|
| Water (g.) | 49 | 49 | 49 | 49 | 49 | 49 |
| Guar gum (g.) | 1 | — | 1 | 1 | — | — |
| Xanthan gum (g.) | — | — | — | — | 1 | 1 |
| Ultrawet 30DS (g.) | 0.5 | 0.5 | 0.5 | 0.5 | 0.5 | 0.5 |
| Renex 30 (g.) | 0.5 | 0.5 | 0.5 | 0.5 | 0.5 | 0.5 |
| Polyco 2151, 55% (g.) | — | 4 | 2 | 4 | — | — |
| Rhoplex AC35, 50% (g.) | — | — | — | — | 4 | 4 |
| Total weight (g.) | 51 | 54 | 53 | 55 | 55 | 66 |

TABLE I-continued

| Example No. | 1 | 2 | 3 | 4 | 5 | 6 |
|---|---|---|---|---|---|---|
| Stability Test | | | | | | |
| Dilution ratio concentrate:water | 1:4 | 1:8 | 1:8 | 1:15 | 1:8 | 1:15 |
| Stability (min.) After cement addn. | 5 | 4 | 35 | 45 | 45 | 40 |
| Stability (min.) | — | — | 30 | 40 | 40 | 35 |

Examples 7-11, as set forth in Table II below, illustrate formulations containing portland cement and aggregates with and without a stabilized foaming composition. The components are set forth in parts by weight.

TABLE II

| Example No. | 7 | 8 | 9 | 10 | 11 | 12 | 13 |
|---|---|---|---|---|---|---|---|
| Water | 14.5 | 41.5 | 62.5 | 82 | 64.5 | 45 | 40 |
| Portland cement | 100 | 100 | 100 | 100 | 100 | 100 | 100 |
| Fly ash | — | 33 | — | 33 | — | 20 | 20 |
| Perlite | 24.6 | 27.7 | — | — | 20.8 | — | — |
| Vermiculite | — | — | 20.8 | 27.7 | — | — | — |
| Sand | — | — | — | — | — | 300 | 100 |
| Fiber Glass (¼") | 1 | 2 | 1.5 | 2 | 1.5 | — | — |
| Foam concentrate | 2.8 | 3.6 | 3.7 | 2.8 | — | 1.3 | 1.3 |
| Ultrawet 30DS | 0.5 | 0.65 | 0.68 | 0.5 | — | 0.24 | 0.24 |
| Tergitol 15S9 | 0.34 | 0.44 | 0.45 | 0.34 | — | 0.16 | 0.16 |
| Polyco 2151, 55% | 0.68 | 0.88 | 0.90 | 0.68 | — | 0.32 | 0.32 |
| Equiv. solids | 0.37 | 0.49 | 0.5 | 0.37 | — | 0.17 | 0.17 |
| Guar Gum | 0.09 | 0.11 | 0.11 | 0.09 | — | 0.04 | 0.04 |
| Water | 1.55 | 1.97 | 2.05 | 1.55 | — | 0.72 | 0.72 |
| Dilution water | 41.7 | 54.4 | 55.3 | 41.7 | — | 18.7 | 18.7 |
| Wet density of boards, lbs/ft³ | 37 | 45 | 41 | 45 | 81 | 105 | 95 |
| Dry density, lbs/ft³ | 26 | 28.6 | 26 | 27.4 | 58 | 90 | 80 |

As stated above, the cementitious composition of the present invention has significant sound absorption capabilities. A preferred example of the present invention having sound absorbing properties is set forth in Example 14 below.

| Example 14 | |
|---|---|
| Component | % by Wt. |
| Water | 25.0 |
| Water Reducing Agent (Lomar-D) | 0.83 |
| Detergent (Tergitol 15-S-9) | 0.55 |
| UCAR 413 (Acrylic Emulsion Polymer) | 4.60 |
| Mineral Cement | 55.30 |
| Pozzolonic Fly Ash | 4.60 |
| Perlite | 9.22 |

In Example 14, siponate soap can be substituted for Tergitol 15-S-9 in which case siponate soap will be present in an amount of 0.5-10 parts by weight. Further, vermiculite can be substituted for perlite in an amount of 10-350 parts by weight.

Additional additives which can be included to provide particular effects include Microsil or Hi-sil thixotropic agents in an amount of 0-5 parts by weight or polyester or glass fibers or fabric in an amount of 0-25 parts by weight.

The wet density of the composition can vary from 20 pounds per cubic foot to 90 pounds per cubic foot.

Compositions, such as that in Example 14, were developed so as to absorb sound utilizing a mineral cement composition having concrete durability. The sound absorbing material can be utilized in itself or can be adhered or glued to almost any substrate. Lightweight sound absorbing panels can be manufactured in many sizes. This allows for retrofitting of old walls, tunnels, homes, airports, railroads, and other structures. The cementitious sound absorbing material of the present invention has outstanding all weather sound absorbing and sound transmission loss properties. Various panels of the material of the present invention have been tested and found to have a noise reduction coefficient (NRC) of 0.95 as is further described below.

FIG. 1 illustrates schematically that sound interacts with a barrier in three ways. Sound may be partially transmitted through the barrier, partially reflected by the barrier back towards the sound source or diffracted by the top edge into sound that goes in all different directions.

The sound absorbing tests performed utilizing cementitious compositions of the present invention were conducted on the basis that the sound absorption coefficient of a surface in a specified frequency band is, aside from the effects of diffraction, the fraction of randomly incident sound energy absorbed or otherwise not reflected. The unit of measurement is sabin per square foot. The noise reduction coefficient (NRC) is the average of the sound absorption coefficients at 250; 500; 1,000 and 2,000 (Hz) expressed to the nearest integral multiple of 0.05.

The measurements made during the testing were according to ASTM designation C423-89 entitled "Standard Test Method For Sound Absorption And Sound Absorption Coefficients By The Reverberation Room Method". Standard mountings were utilized as defined in ASTM designation E795-83 entitled "Standard Practices For Mounting Test Specimens During Sound Absorption Test".

The test specimens utilized consisted of twelve 24 inch wide by 36 inch long by 4½ inch thick concrete test panels placed side by side in type A mountings forming a test specimen 8 feet wide by 9 feet long by 4½ inches thick. Three and ½ inches of the 4½ inch thickness was comprised of sound absorptive material. The top surface of the specimen was roughed up by hand sanding using coarse sand paper, and was also sprayed with Navajo brown acrylic latex stain. A wooden frame was constructed around the specimen on all four sides to minimize edge absorption. The weight of the specimen was 1,869 pounds. The area used to calculate sound absorption coefficients was 72 square foot, the area of the face of the specimen.

The calculated values of sound absorption of the specimen and sound adsorption coefficients together with the calculated measurement of uncertainty for each are tabulated in Table III below.

TABLE III

| Frequency (Hz) | Absorption (Sabin) | Coefficient (Sabin/Ft²) |
|---|---|---|
| 100 | 16.8 ± 5.0 | 0.23 ± 0.07 |
| 125 | 23.9 ± 4.4 | 0.33 ± 0.06 |
| 160 | 25.6 ± 2.9 | 0.36 ± 0.04 |
| 200 | 35.9 ± 3.6 | 0.50 ± 0.05 |
| 250 | 51.5 ± 1.9 | 0.72 ± 0.03 |
| 315 | 60.4 ± 1.8 | 0.84 ± 0.02 |
| 400 | 75.9 ± 1.9 | 1.05 ± 0.03 |
| 500 | 85.8 ± 1.8 | 1.19 ± 0.03 |
| 630 | 82.5 ± 1.4 | 1.15 ± 0.02 |
| 800 | 72.9 ± 1.0 | 1.01 ± 0.01 |
| 1000 | 65.5 ± 0.9 | 0.91 ± 0.01 |
| 1250 | 59.6 ± 0.8 | 0.83 ± 0.01 |
| 1600 | 63.0 ± 0.7 | 0.87 ± 0.01 |
| 2000 | 68.1 ± 0.8 | 0.95 ± 0.01 |
| 2500 | 66.2 ± 1.0 | 0.92 ± 0.01 |
| 3150 | 65.2 ± 1.0 | 0.91 ± 0.01 |
| 4000 | 66.2 ± 1.2 | 0.92 ± 0.02 |

TABLE III-continued

| Frequency (Hz) | Absorption (Sabin) | Coefficient (Sabin/Ft²) |
|---|---|---|
| 5000 | 67.9 ± 1.6 | 0.94 ± 0.02 |

As shown in Table III, the tests indicated that the cementitious composition of the present invention as tested had an NRC value of 0.95 which indicates excellent sound absorbing capability.

Figure 3:
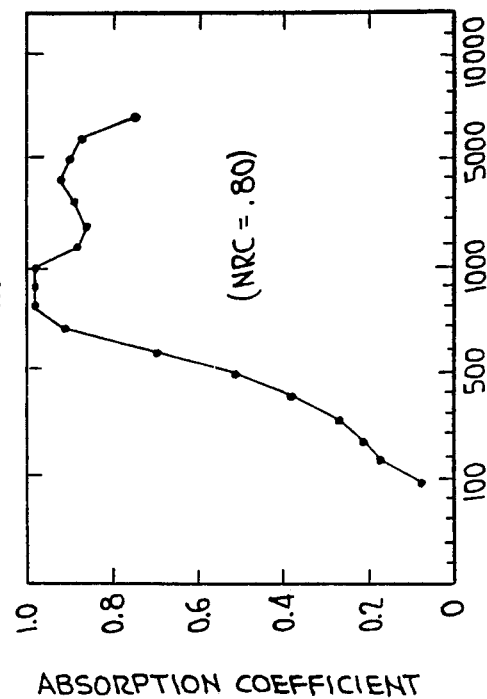
FIG. 3 is a graph illustrating the absorption coefficient of a 2⅜ inch sound trap for a ½ octave band center frequency (Hz).
Figure 2:
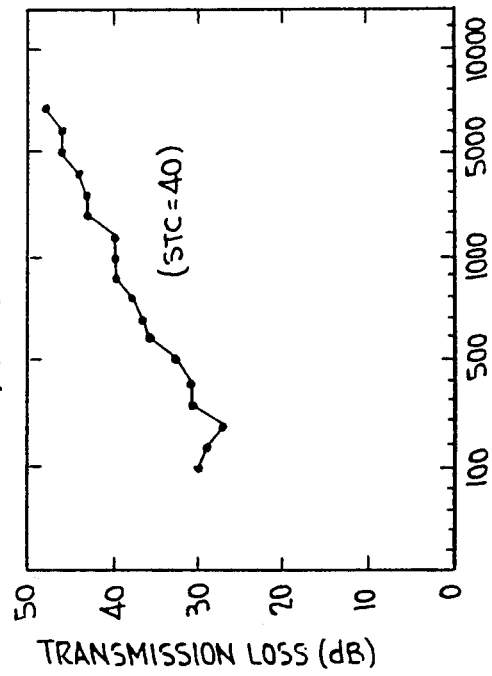
FIG. 2 is a graph illustrating the transmission loss for a 2⅜ inch sound absorbing panel having a high density backing transmission loss for a ⅓ octave band center frequency (Hz).

Regarding transmission through the barrier, the amount of sound energy transmitted through a barrier is determined by a standardized test procedure, ASTM E90-75, which produces the amount of sound energy the barrier attenuates. The amount of attenuation measured by this procedure is called transmission loss (TL) and is expressed in decibels (dB). The larger the numerical value of the TL, the more the barrier attenuates sound. A TL of 0 dB means that the barrier does not attenuate the sound at all, and that all the energy passes through. A TL of 20 dB means that the barrier has attenuated the sound energy to 10% of its original value, for 40 dB to 1% and for 60 dB to 0.1%. For effective barrier performance in a majority of applications, a TL of at least 24 dB is desired. The TL properties of the barrier construction vary with frequency. Therefore, the TL is usually stated for the ⅓ octave frequency bands from 100 Hz to 5,000 Hz. Since it is often inconvenient for many purposes to use the detailed TL data as a function of frequency, a special weighted number called the sound transmission class, i.e. STC, has been devised. The STC for a barrier is obtained by combining in accordance with standard procedure ASTM E413-73 the TL data from 100 to 5,000 Hz into a single value. Again, the higher the STC value, the more the barrier attenuates sound. When the cementitious interconnected cellular material of the present invention is backed by high density cement reinforced with a mesh, it was found that the barrier had a STC value of 40. The testing data and test results are shown in FIGS. 2 and 3. FIG. 2 shows the transmission loss for a 2⅜ inch sound absorbing panel having a high density backing transmission loss for a ⅓ octave band center frequency (Hz). FIG. 3 shows the absorption coefficient of a 2⅜ inch sound trap for a ½ octave band center frequency (Hz).

Regarding the sound absorption by the barrier, when sound impinges upon a barrier, part of the sound energy is reflected and part is absorbed. The absorption usually takes place in either of two ways, i.e. transmission through the barriers or conversion of the acoustic energy into heat by the barrier material. The amount of sound energy absorbed by a material is determined by a standardized test procedure ASTM C423-84A. The amount of absorption is expressed as the ratio of the sound energy absorbed to the sound energy incident to the barrier surface. This ratio is called the absorption coefficient, usually denoted as A. The more sound energy absorbed, the closer this coefficient is to 1.0. Thus, when A=0, no sound energy is absorbed and all incident sound energy is reflected. Conversely, when A=1.0, all the sound energy is absorbed and none of the incident energy is reflected. The sound absorbing properties of materials vary with frequency and as is the case with the TL data, sound absorption data is also stated as a function of ⅓ octave frequency bands for 100 to 5,000 Hz. Sound absorption data is often combined into a single number called the noise reduction coefficient, NRC, which is obtained from the average value of A at 250; 500; 1,000 and 2,000 Hz rounded to the nearest multiple of 0.05. The higher the NRC value, the greater the average sound absorption in this frequency range.

To provide the sound absorbing cementitious composition of the present invention, the sequential order of mixing the components making up the composition is important. With regard to the sound absorbing composition set forth in Example 14, the materials are added in the order indicated. First, a mixer is cleaned and washed out with water prior to use. Fresh potable water is then metered into the mixer. The water reducing agent, detergent, and latex acrylic are added to the water while the mixer is rotating. When a good foaming solution is observed, the mineral cement and fly ash are added. Mixing is continued for approximately 1.5 to 2 minutes or until a uniform mixture is achieved. The aggregate is then added and mixing continued only until a uniform mixture is achieved. The composition in the mixer is then emptied into a mold and carefully distributed evenly over the mold surface. If overmixing occurs when the aggregate is added to the composition, the density of the composition will be caused to be increased. Overmixing kills the foam and, therefore, a higher density will occur.

Molds which can be utilized can be made of plastic, fiberglass, vacuum-formed films or mineral cement. The surface of the molds duplicate the aesthetic values desired. The exterior surface of the panels to be fabricated can be in a wide range of colors, textures or designs. Molds are usually designed for tilt-up so that the cast part can be removed vertically in its green state. Lifting rings are attached to the reinforcing steel cast into the mold part. The sound absorbing material can be cast in a face down position to duplicate the mold surface. Another method is to pour high density concrete first into a form and thereafter, prior to or during the casting, the reinforcing steel is put in place and covered with concrete. Additional forms are placed so as to form a border around the entire mold. After a few hours, the border forms are removed and the sound absorbing concrete is poured into the level flush with the borders. Generally, for most purposes, a 2 to 5 inch thickness is adequate.

The composition of the present invention can be dry blended and shipped in bags or other suitable containers. When the composition is ready to be used, the bag is emptied into a ribbon or mortar mixture and mixed until uniform. As set forth above, overmixing will increase the density of the resulting product. A small percentage of a water reducing agent can be premixed therewith. Such water reducers have only recently become available. By admixing about 0.5% to 1.5% of the water reducer to portland cement, it is possible to produce practical pastes for lightweight sound absorbing concrete with 10%-25% less water without decreasing the "slump" or the workability of the cement slurries. Examples of suitable water reducers include "Mighty" as manufactured by ICI U.S. and which consists of about 90% of a polymer of the sodium salt of naphthalene sulfonic acid partially condensed with formaldehyde and about 10% sodium gluconate as described in U.S. Pat. No. 3,686,133. Melment F-10 as manufactured by American Admixtures, is similar to Mighty except that a melamine ring is used instead of a naphthalene ring in the polymer component. Melment F-10 is present as an aqueous solution. Another water reducer is Lomar D as manufactured by Diamond- Shamrock and is identical to the 90% polymer component of Mighty. Another known water reducer is FX-32 as made by Fox Industries and is a catalytic high early strength admixture for portland cement which will reduce the water content 15%–25%.

When portland cement, with or without an aggregate, or gypsum cement slurries are cast in molds of naturally water repellent synthetic polymers, such as polypropylene, polystyrene or polyacrylate, the casting after curing assumes the shape of the mold. However, the surface which was in contact with the mold surface is either dull or semi-glossy. This partial gloss, when present, disappears after exposure to the air for about a day or upon the admixture of about 0.25%–2.0% based on the weight of the cement of one of the water reducers as mentioned above to the formulation. The water reducer admixtures provide improved performance. They form a lubricating film, enveloping both the cement and aggregate to reduce friction between the solids. Shrinkage is reduced and impermeability and workability is increased. Plastic molds do not require a release agent on the surface and can be utilized several times. Air pressure is sometimes used to break the vacuum between the plastic mold and the sound absorbing concrete composite panels.

The sound absorbing concrete having an interconnected cellular structure also provides excellent thermal insulation and fire proofness. For example, a two-inch thick material can withstand 2000° F. for more than four hours without the opposite side going over 800° F. The sound absorbing panels can be made in varying thicknesses and sizes with reinforcements where required. The recommended coloring is now found to be with a latex acrylic polymer that provides for an excellent uniform color, increases water resistance, and adds to the strength of material.

As will be apparent to one skilled in the art, various modifications can be made within the scope of the aforesaid description. Such modifications being within the ability of one skilled in the art form a part of the present invention and are embraced by the appended claims.

It is claimed:

1. A cementitious composition with sound absorbing capability having an interconnected open cellular structure such that at least 20–100% of said composition's surface area is open to provide access to sound waves and has an air-dry density in a range of 12–90 pounds per cubic foot comprising a cement, an aggregate, water, a water reducing agent and a stabilized foaming composition wherein said stabilized foaming composition comprises at least one water-soluble film forming agent and at least one foaming agent.

2. A cementitious composition according to claim 1 further comprising fly ash.

3. A cementitious composition according to claim 1 further comprising a colorant.

4. A cementitious composition according to claim 1 wherein said cement is selected from a group consisting of portland cement, calcium cement, gypsum cement, and magnesia cement.

5. A cementitious composition according to claim 1 wherein said aggregate is selected from the group consisting of perlite, vermiculite, expanded shale, clay, and sand.

6. A cementitious composition according to claim 1 wherein said water-soluble film forming agent is a resin emulsion.

7. A cementitious composition according to claim 1 wherein said water reducing agent is present in an amount greater than 0 but equal to or less than 3 parts by weight.

8. A cementitious composition according to claim 1 wherein said at least one foaming agent is a surfactant selected from the group consisting of nonionic surfactants, anionic surfactants and mixtures thereof.

9. A cementitious composition according to claim 1 further comprising a fibrous material.

10. A cementitious composition according to claim 9 wherein said fibrous material is selected from the group consisting of fiberglass or polyester fibers.

11. A cementitious composition according to claim 1 further comprising a silicon containing compound.

12. A cementitious composition according to claim 1 wherein said cement is present in an amount of about 100 parts by weight, said aggregate is present in an amount of from about 10–350 parts by weight, said water is present in an amount of from about 35–150 parts by weight, said at least one film forming agent is present in an amount of from 1–96 parts by weight, said water reducing agent is present in an amount greater than 0 but equal to or less than 3 parts by weight and said at least one forming agent is present in an amount of from about 0.5–5 parts by weight.

13. A process of making a cementitious composition having sound absorbing capability and an interconnected open cellular structure such that at least 20–100% of said composition's surface area is open to provide access to sound waves and has an air-dry density in a range of 12–90 pounds per cubic foot comprising the sequential steps of (a) admixing water with a water reducing agent and thereafter adding at least one foaming agent and at least one water-soluble film forming agent; (b) adding cement to said admixture of (a) upon foaming of said admixture of (a); (c) adding an aggregate to the admixture of (b) and mixing until a uniform mixture is achieved; and (d) placing the admixture of (c) into a mold.

14. A process according to claim 13 wherein fly ash is also admixed in step (b).

15. A process according to claim 13 wherein said at least one foaming agent is selected from the group consisting of nonionic surfactants, anionic surfactants, and mixtures thereof.

16. A process according to claim 13 wherein said water-soluble film forming agent is a resin emulsion.

17. A process according to claim 13 wherein said cement is selected from the group consisting of portland cement, calcium cement, gypsum cement, and magnesia cement.

18. A process according to claim 13 wherein said aggregate is selected from the group consisting of perlite, vermiculite, expanded shale, clay, and sand.

19. A process according to claim 13 wherein said water is present in an amount of from about 35–150 parts by weight, said at least one foaming agent is present in an amount of from about 0.5–5 parts by weight, said water reducing agent is present in an amount greater than 0 but equal to or less than 3 parts by weight, said water-soluble film forming agent is present in an amount of from about 1–96 parts by weight, said cement is present in an amount of about 100 parts by weight and said aggregate is present in an amount of from about 10–350 parts by weight.

20. The cementitious composition produced according to claim 13.